US009950658B2

(12) United States Patent
Salter et al.

(10) Patent No.: US 9,950,658 B2
(45) Date of Patent: Apr. 24, 2018

(54) PRIVACY WINDOW SYSTEM (71) Applicant: Ford Global Technologies, LLC, Dearborn, MI (US)

(72) Inventors: Stuart C. Salter, White Lake, MI (US); Terry Lobsinger, Farmington Hills, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 14/744,637

(22) Filed: Jun. 19, 2015

(65) Prior Publication Data

US 2015/0283937 A1 Oct. 8, 2015

Related U.S. Application Data (63) Continuation-in-part of application No. 14/721,274, filed on May 26, 2015, which is a continuation-in-part
(Continued)

(51) Int. Cl.
| *B60Q 1/26* | (2006.01) |
| *H05B 37/02* | (2006.01) |
| *B60J 3/04* | (2006.01) |
| *B60R 25/10* | (2013.01) |
| *B60R 25/102* | (2013.01) |
| *B60Q 3/68* | (2017.01) |

(Continued)

(52) U.S. Cl.
CPC ............... *B60Q 1/268* (2013.01); *B60J 3/04* (2013.01); *B60R 25/1001* (2013.01); *B60R 25/102* (2013.01); *B60R 25/1004* (2013.01); *H05B 37/0218* (2013.01); *H05B 37/0227* (2013.01); *B60Q 3/208* (2017.02); *B60Q 3/68* (2017.02); *B60Q 3/80* (2017.02); *Y02B 20/44* (2013.01); *Y02B 20/46* (2013.01)

(58) Field of Classification Search
CPC .......... B60Q 1/268; B60Q 3/208; B60Q 3/80; B60Q 3/68; B60J 3/04; B60R 25/1001; B60R 25/1004; B60R 25/102; H05B 37/0218; H05B 37/0227; Y02B 20/44; Y02B 20/46
USPC ....................................... 362/503, 510, 464
See application file for complete search history.

(56) References Cited

U.S. PATENT DOCUMENTS

| 2,486,859 A | 11/1949 | Meijer et al. |
| 5,053,930 A | 10/1991 | Benavides |

(Continued)

FOREIGN PATENT DOCUMENTS

| CN | 101337492 A | 1/2009 |
| CN | 201169230 Y | 2/2009 |

(Continued)

*Primary Examiner* — Elmito Breval
*Assistant Examiner* — Glenn Zimmerman
(74) *Attorney, Agent, or Firm* — Jason Rogers; Price Heneveld LLP (57) ABSTRACT

A privacy window system of a vehicle is provided herein. A light-producing assembly is operable to illuminate a window such that visibility there through becomes obscured. A proximity sensor is configured for object detection. A controller is in communication with the light-producing assembly and the proximity sensor. When the proximity sensor detects an object proximate the window, the controller activates the light-producing assembly.

12 Claims, 3 Drawing Sheets

Related U.S. Application Data of application No. 14/603,636, filed on Jan. 23, 2015, now Pat. No. 9,573,517, which is a continuation-in-part of application No. 14/086,442, filed on Nov. 21, 2013, now abandoned.

(51) Int. Cl.
*B60Q 3/208* (2017.01)
*B60Q 3/80* (2017.01)

(56) References Cited

U.S. PATENT DOCUMENTS

| | | |
|---|---|---|
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,580,472 B1 | 6/2003 | Willingham et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,348,736 B2 | 3/2008 | Piepgras et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,102,856 B2 | 1/2012 | Albahri |
| 8,120,236 B2 | 2/2012 | Auday et al. |
| 8,136,425 B2 | 3/2012 | Bostick |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,705,162 B2 | 4/2014 | Brown et al. |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0202912 A1* | 8/2008 | Boddie ............... H03K 17/962 200/600 |
| 2009/0114928 A1* | 5/2009 | Messere ............. B32B 17/10 257/88 |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0288725 A1 | 11/2011 | Yuter |
| 2012/0001406 A1 | 1/2012 | Paxton et al. |
| 2012/0020102 A1* | 1/2012 | Lambert ............. B60K 35/00 362/503 |
| 2012/0089273 A1* | 4/2012 | Seder ................. B60Q 1/268 701/2 |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0113397 A1* | 5/2013 | Salter ................. F21V 23/04 315/362 |
| 2013/0335994 A1 | 12/2013 | Mulder et al. |
| 2014/0002405 A1* | 1/2014 | Salter ................. H03K 17/962 345/174 |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0202643 A1 | 7/2014 | Hikmet et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0002768 A1 | 1/2015 | Wu |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0214535 A1* | 7/2016 | Penilla ............... G06Q 20/18 |
| 2016/0236613 A1 | 8/2016 | Trier |
| 2016/0257252 A1* | 9/2016 | Zaitsev ............. G06K 9/00791 |
| 2017/0158125 A1 | 6/2017 | Schuett et al. |

FOREIGN PATENT DOCUMENTS

| | | |
|---|---|---|
| CN | 201193011 Y | 2/2009 |
| CN | 103171409 A | 6/2013 |
| CN | 202986760 U | 6/2013 |

(56) References Cited

FOREIGN PATENT DOCUMENTS

| | | | |
|---|---|---|---|
| CN | 103423943 | A | 12/2013 |
| CN | 204127823 | U | 1/2015 |
| DE | 4120677 | A1 | 1/1992 |
| DE | 29708699 | U1 | 7/1997 |
| DE | 10319396 | A1 | 11/2004 |
| EP | 2778209 | A1 | 9/2014 |
| JP | H08322113 | A | 12/1996 |
| JP | 2000159011 | A | 6/2000 |
| JP | 2007238063 | A | 9/2007 |
| JP | 2010013215 | A | 1/2010 |
| KR | 20060026531 | A | 3/2006 |
| WO | 2006047306 | A1 | 5/2006 |
| WO | 2012156779 | A1 | 11/2012 |
| WO | 2014068440 | A1 | 5/2014 |
| WO | 2014161927 | A1 | 10/2014 |

* cited by examiner

PRIVACY WINDOW SYSTEM

CROSS-REFERENCE TO THE RELATED APPLICATIONS

This application is a continuation-in-part of U.S. patent application Ser. No. 14/721,274, filed May 26, 2015, entitled "PRIVACY WINDOW ASSEMBLY," which is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a privacy window system of a vehicle is provided. A light-producing assembly is operable to illuminate a window such that visibility therethrough becomes obscured. A proximity sensor is configured for object detection. A controller is in communication with the light-producing assembly and the proximity sensor. When the proximity sensor detects an object proximate the window, the controller activates the light-producing assembly.

According to another aspect of the present invention, a privacy window system of a vehicle is provided. A light-producing assembly is coupled to a window and is operable to illuminate the window such that visibility therethrough becomes obscured. A proximity sensor is configured to detect objects outside the vehicle. A controller is in communication with the light-producing assembly and the proximity sensor. When an object is detected proximate the window, the controller activates the light-producing assembly.

According to yet another aspect of the present invention, a privacy window system of a vehicle is provided. A plurality of light-producing assemblies are each configured to illuminate a corresponding window such that visibility therethrough becomes obscured. A proximity sensor assembly is associated with each window and is configured for object detection. A controller is in communication with each of the light-producing assemblies and the proximity sensor assembly. When an object is detected proximate one of the windows, the controller activates the corresponding light-producing assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure is related to a privacy window system of a vehicle. The privacy window system is operable to reduce visibility through one or more windows of the vehicle to prevent onlookers from seeing the contents of the vehicle cabin. While the privacy window system is contemplated for use in automobiles, it should be appreciated that the privacy window assembly provided herein may be similarly used in other types of vehicles designed to transport one or more passengers such as, but not limited to, aircraft, watercraft, and locomotives.

Figure 1:
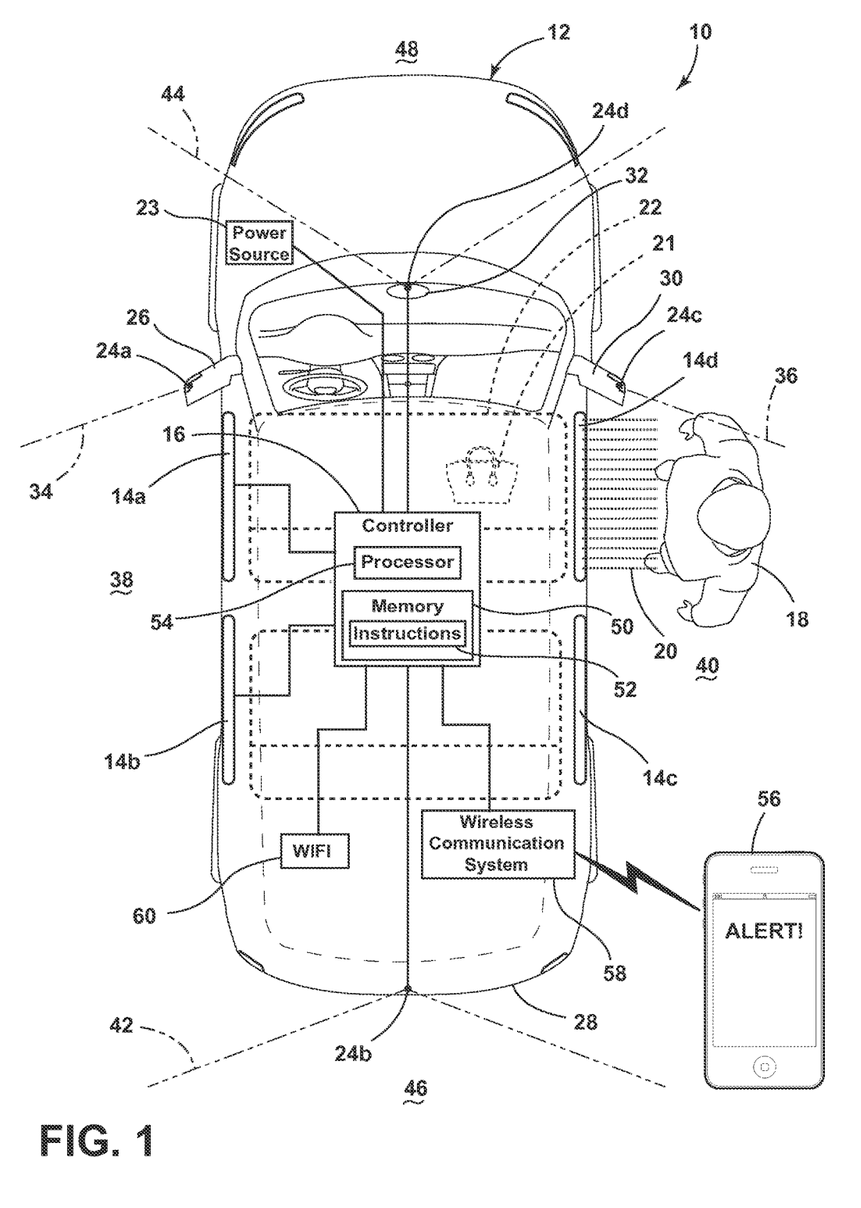
FIG. 1 illustrates a schematic view of a vehicle equipped with a privacy window system, according to one embodiment.

Referring to FIG. 1, a schematic diagram of a privacy window system 10 of a vehicle 12 is shown according to one embodiment, in which the vehicle 12 is unoccupied. It is contemplated, however, that the privacy window system 10 may also be used when the vehicle 12 is occupied while parked or in drive. As shown in FIG. 1, the vehicle 12 is equipped with one or more privacy windows, shown as privacy windows 14a-14d, each of which corresponds to a side window of the vehicle 12. Privacy windows 14a-14d are each configured to illuminate whereby light is directed in an outward vehicle direction. Privacy windows 14a-14d are each selectively activated by a controller 16 when an object is detected proximate the vehicle 12 by one or more proximity sensor assemblies (e.g., proximity sensor assembly 68, FIG. 2). For example, when an object, such as onlooker 18, is detected proximate privacy window 14d, the controller 16 may activate privacy window 14d. The resultant illumination, as demonstrated by lines 20, causes visibility though the privacy window 14d to become obscured. In this manner, onlooker 18 is prevented from seeing the contents of the vehicle cabin, which may include items of value such as a purse 21 left on front passenger seat 22. As an added measure of privacy, the controller 16 may also activate any remaining privacy windows (e.g., privacy window 14c)

located on the same side of the vehicle 12 as privacy window 14*d* to prevent onlooker 18 from looking therethrough. Once onlooker 18 is no longer detected, the controller 16 may deactivate privacy window 14*d* along with any other privacy windows that were activated as a result of onlooker 18 being detected proximate privacy window 14*d*. The controller 16 may be connected to a power source 23 including a vehicle power supply or alternative power supply.

Whenever an object is detected, the controller 16 may also activate a camera system including cameras 24*a*-24*d* that are positioned on left side mirror 26, rear structure 28, right side mirror 30, and rearview mirror 32, respectively. As shown, cameras 24*a* and 24*c* each have a field of view 34, 36 that include a side area 38, 40 of the vehicle 12 whereas cameras 24*b* and 24*d* each have a field of view 42, 44 that include a rear and front area 46, 48 of the vehicle 12, respectively. So long as an object remains detected, captured images from the cameras 24*a*-24*d* may be recorded and stored to a memory 50 of the controller 16 and later retrieved for viewing purposes in the event a theft occurs. The memory 50 may also contain instructions 52 stored thereon that are executed by a processor 54, in accordance with which the controller 16 will perform its intended function. While the memory 50 has been shown as a single block, it should be appreciated that the memory 50 may be realized as one or more physical storage units independent from one another, with similar or different storage properties. In the same respect, while the controller 16 has been shown as a single block, it should be appreciated that the controller 16 may also be realized as one or more independent units.

According to one embodiment, the system 10 may be configured to send an alert to a remote electronic device 56 notifying a user of the remote electronic device 56 that an object is detected. For example, the controller 16 may establish a radio frequency (RF) communication with the remote electronic device 56 via a wireless communication system 58 onboard the vehicle 12 and through which the alert is sent. The RF communication may be unidirectional such that the remote electronic device 56 is only capable of receiving information from the wireless communication system 58. Alternatively, the RF communication may be bidirectional such that the remote electronic device 56 is able to receive and send information to the wireless communication system 58. For instance, a user may send a car alarm request to the wireless communication system 58 such that a vehicle alarm is triggered in response to receiving an alert that an object is detected.

Additionally or alternatively, the system 10 may be configured to provide a live video stream that is accessible by the remote electronic device 56. For example, captured images from the cameras 24*a*-24*d* may be uploaded to a website via a WiFi communication system 60 onboard the vehicle 12. Alternatively, the captured images may be viewed via software stored on the remote electronic device 56. In this manner, a user of the remote electronic device 56 may respond accordingly based on the contents of the live video stream. For instance, the user may use the remote electronic device 56 to send an alarm request, as described previously, or alert law enforcement if the remote electronic device 56 has phone functionality. With respect to the illustrated embodiment, it is contemplated that the remote electronic device 56 may include a smartphone, a desktop, a tablet, and the like.

Figure 2:
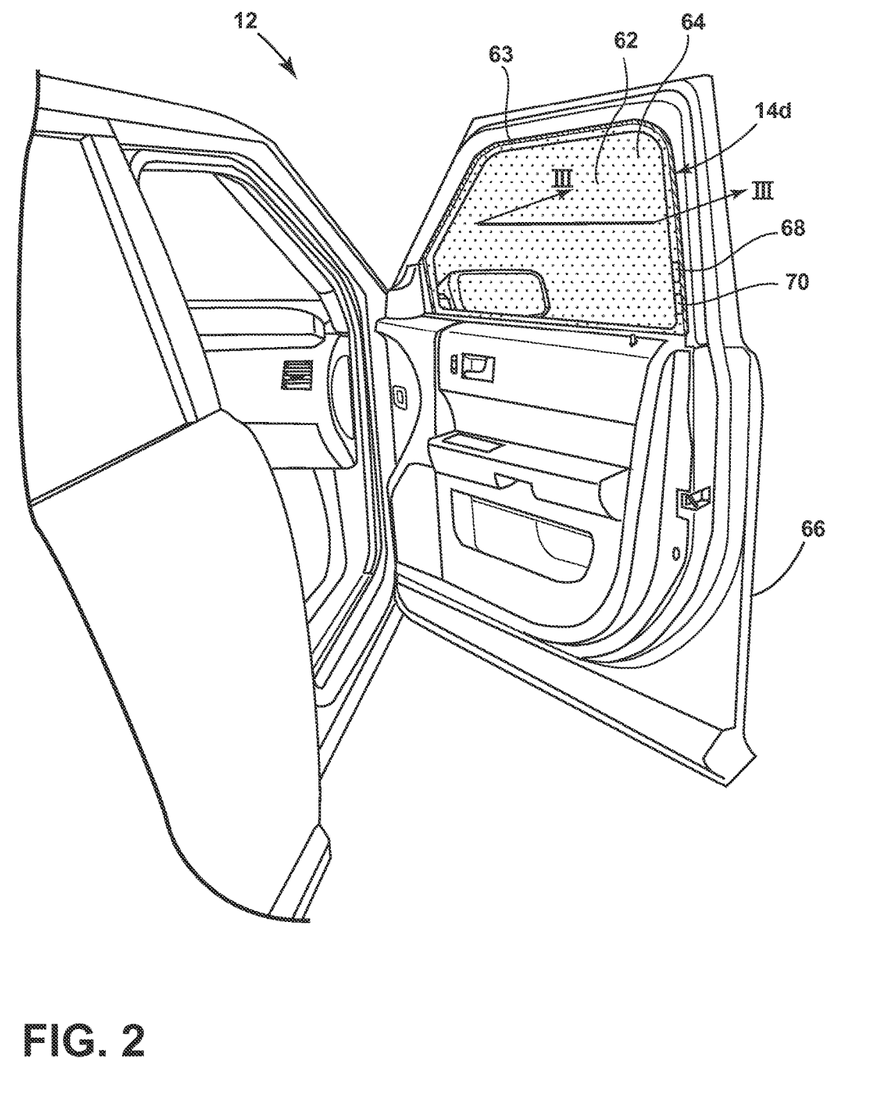
FIG. 2 illustrates a privacy window according to one embodiment.

Referring to FIG. 2, privacy window 14*d* is shown according to one embodiment. It should be appreciated that privacy windows 14*a*-14*c* may be realized in a similar manner. As shown, privacy window 14*d* includes a light-producing assembly 62 coupled to side window 63. The light-producing assembly 62 may include a plurality of light sources, including light emitting diodes (LEDs 64), which are printed on a side of side window 63. According to one embodiment, the LEDs 64 are printed to the side of the side window 63 facing the interior of the vehicle 12 and are oriented to face outward from the vehicle 12. In this way, the light-producing assembly 62 is shielded from the external environment when door 66 is closed. As described in greater detail below, the LEDs 64 are relatively small in size and may be dispersed in variable densities while maintaining adequate visibility through the privacy window 14*d* when the LEDs 64 are in a deactivated state. When activated, the privacy window 14*d* illuminates as a result of light from the LEDs 64 being transmitted through side window 63, thereby causing visibility through the privacy window 14*d* to become obscured. In some embodiments, described in greater detail below, a photoluminescent structure (not shown) may be disposed (e.g., between the LEDs 64 and the privacy window 14*d*) and configured to luminesce in response to light emitted from the LEDs 64. In such an arrangement, the luminescent light is transmitted through side window 63 instead of light emitted from the LEDs. In either embodiment, the LEDs 64 of the light-producing assembly 62 may be wired to the controller 16 through door 66.

As is further shown in FIG. 2, the privacy window 14*d* may also include a proximity sensor assembly 68 coupled thereto. The proximity sensor assembly 68 may be disposed on either side of the privacy window 14*d* or elsewhere on the vehicle 12 such as on or integrated with a component (e.g., a trim panel) of door 66. With respect to the illustrated embodiment, the proximity sensor assembly 68 may be arranged along the outer edge of the privacy window 14*d* to surround the light-producing assembly 62. The proximity sensor assembly 68 may include one or more capacitive sensors 70, or any other sensor type that is capable of detecting an object located at a distance therefrom. Each capacitive sensor 70 may be sized to have an electric field projection distance that enables objects located proximate the privacy window 14*d* to be detected. As defined herein, proximate refers to a distance within which an object, most notably an onlooker, is able to see the contents of the vehicle cabin through a given privacy window (e.g., privacy window 14*d*). Contents may include items left on seats or in foot spaces, open containers, vehicle-related equipment such as navigation systems and charging devices, or any other items or vehicle-related equipment that are generally located in the vehicle cabin.

Figure 3:
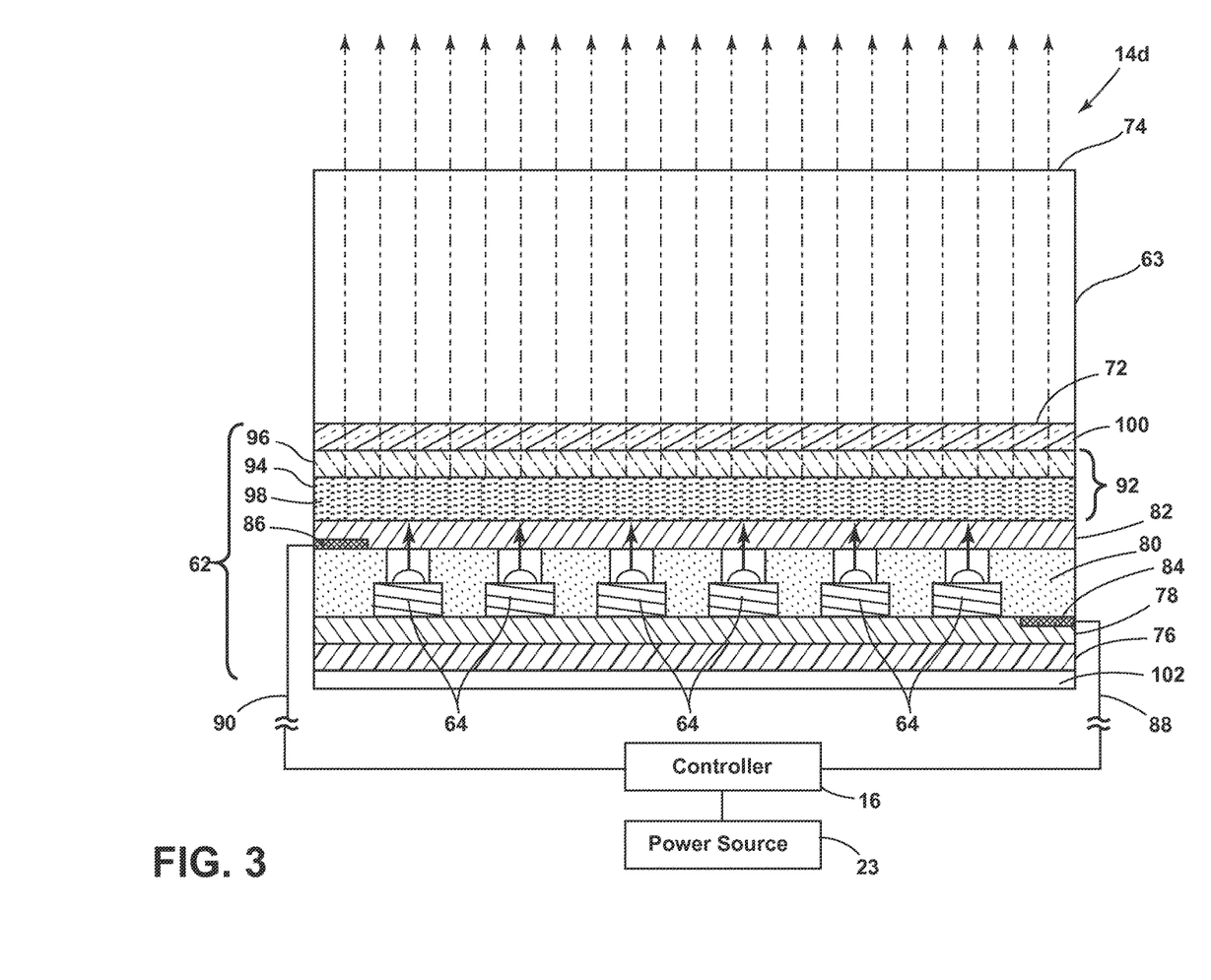
FIG. 3 is a cross-sectional view of the privacy window taken along line III-III of FIG. 2.

Referring to FIG. 3, a cross-sectional view of privacy window 14*d* is shown according to one embodiment. It is to be understood that privacy windows located elsewhere on the vehicle 12 may be similarly realized. In the illustrated embodiment, privacy window 14*d* includes light-producing assembly 62 coupled to side window 63 at window portion 72, which faces toward the interior of the vehicle 12. In another embodiment, the light-producing assembly 62 may be coupled to the side window 63 at window portion 74, which faces toward the exterior of the vehicle 12. In yet another embodiment, the light-producing assembly 62 may be integrated with the side window 63 and positioned between window portions 72 and 74. However, by coupling the light-producing assembly 62 to window portion 72 of the side window 63, the light-producing assembly 62 is not in direct contact with the external environment. While the light-producing assembly 62 is shown in a planar configuration, it should be appreciated that non-planar configurations are possible in instances where it is desired to couple the light-producing assembly 62 to a curved window portion.

With respect to the illustrated embodiment, the light-producing assembly 62 includes a substrate 76, which may include a substantially transparent polycarbonate, polymethyl methacrylate (PMMA), or polyethylene terephthalate (PET) material on the order of 0.005 to 0.060 inches thick. A positive electrode 78 is arranged over the substrate 76 and includes a substantially transparent conductive material such as, but not limited to, indium tin oxide. The positive electrode 78 is electrically connected to LEDs 64, which are arranged within a semiconductor ink 80 and applied over the positive electrode 78. Likewise, a substantially transparent negative electrode 82 is also electrically connected LEDs 64. The negative electrode 82 is arranged over the semiconductor ink 80 and includes a transparent or translucent conductive material such as, but not limited to, indium tin oxide. In alternative embodiments, the positive electrode 78 may be flip-flopped with the negative electrode 82.

Each of the positive and negative electrodes 78, 82 are electrically connected to controller 16 via a corresponding bus bar 84, 86 connected to a corresponding wiring 88, 90. The bus bars 84, 86 may be printed along opposite edges of the positive and negative electrodes 78, 82 and the points of connection between the bus bars 84, 86 and the wirings 88, 90 may be at opposite corners of each bus bar 84, 86 to promote uniform current distribution along the bus bars 84, 86. As described previously herein, the controller 16 may also be electrically connected to power source 23, which may correspond to a vehicular power source operating at 12 to 16 VDC.

The LEDs 64 may be dispersed in a random or controlled fashion within the semiconductor ink 80 and are disposed facing vehicle-outward and configured to emit focused or non-focused light. The LEDs 64 may correspond to micro-LEDs of gallium nitride elements on the order of 5 to 400 microns in size and the semiconductor ink 80 may include various binders and dielectric material including, but not limited to, one or more of gallium, indium, silicon carbide, phosphorous, and/or translucent polymeric binders. In this manner, the semiconductor ink 80 may contain various concentrations of LEDs 64 such that the density of the LEDs 64 may be adjusted for various lighting applications. In some embodiments, the LEDs 64 and semiconductor ink 80 may be sourced from Nth Degree Technologies Worldwide Inc. The semiconductor ink 80 can be applied through various printing processes, including ink jet and silk screen processes to selected portion(s) of the positive electrode 78. More specifically, it is envisioned that the LEDs 64 are dispersed within the semiconductor ink 80, and shaped and sized such that a substantial quantity of them align with the positive and negative electrodes 78, 82 during deposition of the semiconductor ink 80. The portion of the LEDs 64 that ultimately are electrically connected to the positive and negative electrodes 78, 82 may be selectively activated and deactivated by the controller 16. Additional information regarding the construction of light-producing assemblies is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3, the light-producing assembly 62 further includes at least one photoluminescent structure 92 arranged over the negative electrode 82 as a coating, layer, film or other suitable deposition. With respect to the presently illustrated embodiment, the photoluminescent structure 92 may be arranged as a multi-layered structure including an energy conversion layer 94 and an optional stability layer 96. The energy conversion layer 94 includes at least one photoluminescent material 98 having energy converting elements with phosphorescent or fluorescent properties. For example, the photoluminescent material 98 may include organic or inorganic fluorescent dyes including rylenes, xanthenes, porphyrins, phthalocyanines. Additionally or alternatively, the photoluminescent material 98 may include phosphors from the group of Ce-doped garnets such as YAG:Ce. The energy conversion layer 94 may be prepared by dispersing the photoluminescent material 98 in a polymer matrix to form a homogenous mixture using a variety of methods. Such methods may include preparing the energy conversion layer 94 from a formulation in a liquid carrier medium and coating the energy conversion layer 94 to the negative electrode 82 or other desired substrate. The energy conversion layer 94 may be applied to the negative electrode 82 by painting, screen printing, flexography, spraying, slot coating, dip coating, roller coating, and bar coating. Alternatively, the energy conversion layer 94 may be prepared by methods that do not use a liquid carrier medium. For example, the energy conversion layer 94 may be rendered by dispersing the photoluminescent material 98 into a solid state solution (homogenous mixture in a dry state) that may be incorporated in a polymer matrix formed by extrusion, injection, compression, calendaring, thermoforming, etc.

To protect the photoluminescent material 98 contained within the energy conversion layer 94 from photolytic and thermal degradation, the photoluminescent structure 92 may optionally include stability layer 96. The stability layer 96 may be configured as a separate layer optically coupled and adhered to the energy conversion layer 94 or otherwise integrated therewith. The stability layer 96 may be combined with the energy conversion layer 94 through sequential coating or printing of each layer, sequential lamination or embossing, or any other suitable means. The photoluminescent structure 92 may be coupled to window portion 72 via an adhesive layer 100 arranged over the photoluminescent structure 92. Additional information regarding the construction of photoluminescent structures is disclosed in U.S. Pat. No. 8,232,533 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent structure 92 is configured to luminesce in response to excitation by light emitted by the LEDs 64. More specifically, the light emitted by LEDs 64 undergoes an energy conversion where it's converted by the photoluminescent material 98 and re-emitted therefrom at a different wavelength. Light emitted by the LEDs 64 is referred to herein as inputted light, whereas light re-emitted from the photoluminescent material 98 is referred to herein as converted light. According to one embodiment, the photoluminescent material 98 may be formulated to convert inputted light into a longer wavelength light, otherwise known as down conversion. Alternatively, the photoluminescent material 98 may be formulated to convert inputted light into a shorter wavelength light, otherwise known as up conversion. Under either approach, light converted by the photoluminescent material 98 may be immediately outputted from the photoluminescent structure 92 or otherwise used in an energy cascade, wherein the converted light serves as inputted light to excite another formulation of photoluminescent material located within the energy conversion layer 94, whereby the subsequent converted light may then be outputted from the photoluminescent structure 92 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

In some embodiments, the photoluminescent structure 92 may exhibit Lambertian emittance, whereby a portion of the converted light may be emitted in a vehicle-inward direction. As such, the light-producing assembly 62 may optionally include a reflective layer 102 coupled to the substrate 76 to redirect converted light in a vehicle-outward direction. The reflective layer 102 may also serve to protect the light-producing assembly 62 from physical and chemical damage arising from environmental exposure.

According to one embodiment, the photoluminescent material 98 is formulated to have a Stokes shift resulting in the converted light having an emission spectrum expressed in a desired color, which may vary depending on the lighting application. For example, the energy conversion process may be undertaken by way of down conversion, whereby the inputted light includes light on the lower end of the visibility spectrum such as blue, violet, or ultraviolet (UV) light. Doing so enables blue, violet, or UV LEDs to be used as the LEDs 64, which may offer a relative cost advantage over other colors of LEDs or simply using LEDs of the desired color and omitting the photoluminescent structure 92 altogether.

In alternative embodiments, the energy conversion layer 94 may include more than one distinct photoluminescent material, each configured to convert inputted light into a longer or shorter wavelength light. In one embodiment, the distinct photoluminescent materials may be interspersed within the energy conversion layer 94. Alternatively, the distinct photoluminescent materials may be isolated from each other if desired. For example, the distinct photoluminescent materials may be arranged to alternate in a tessellation or other pattern. In either embodiment, each distinct photoluminescent material may be uniquely excited by a corresponding portion of the LEDs 64, which may be variously arranged. In some embodiments, each distinct photoluminescent material may be formulated to have a Stokes shift resulting in the associated converted light having an emission spectrum expressed in a unique color such that the resultant luminescence corresponds to a light mixture of the converted light from each distinct photoluminescent material. By mixing the converted light outputted from two or more distinct photoluminescent materials, a greater diversity of colors may be expressed that would otherwise be unachievable through the excitation of a single photoluminescent material. Contemplated colors include light mixtures containing any combination of red, green, and blue light, all of which may be achieved by selecting the appropriate combinations of photoluminescent materials and LEDs. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," filed Apr. 27, 2015, the entire disclosure of which are incorporated herein by reference.

In operation, the controller 16 may control the intensity of the LEDs 64 to ultimately affect the brightness in which the photoluminescent structure 92 luminesces. For example, increasing the intensity of the LEDs 64 generally results in the photoluminescent structure 92 exhibiting a brighter luminescence. The controller 16 may control the intensity of the LEDs 64 through pulse-width modulation or direct current control. When the light-producing assembly 62 is active, the controller 16 may control the light emission duration of the LEDs 64 to affect the duration in which the photoluminescent structure 92 luminesces, which in turn determines the length in which visibility though privacy window 14d is obscured. In one embodiment, the controller 16 may activate the LEDs 64 so long as onlooker 18 or some other object continues to be detected.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A privacy window system comprising:
 a light-producing assembly disposed on a side window of a vehicle and operable to illuminate a substantial entirety of the side window to obscure visibility therethrough;
 proximity sensors disposed along an entire outer edge of the side window to surround the light-producing assembly; and
 a controller for activating the light-producing assembly based on the proximity sensors detecting an onlooker outside the vehicle and proximate the side window.

2. The privacy window system of claim 1, wherein the light-producing assembly comprises a plurality of light sources and a photoluminescent structure configured to luminesce in response to excitation by light emitted from the plurality of light sources such that the resultant luminescent light is emitted through the window.

3. The privacy window system of claim 1, wherein the proximity sensors comprise capacitive sensors.

4. The privacy window system of claim 1, further comprising a camera system disposed onboard the vehicle and in communication with the controller, wherein the camera system is operable to capture and record images of the onlooker.

5. The privacy window system of claim 1, further configured to send an alert to a remote electronic device notifying a user of the remote electronic device that the onlooker is detected.

6. The privacy window system of claim 4, further configured to provide a live video stream accessible by a remote electronic device.

7. A privacy window system of a vehicle, comprising:
 a plurality of light-producing assemblies, each coupled to a corresponding side window of the vehicle and configured to illuminate the corresponding side window to obscure visibility therethrough;

proximity sensors coupled to each side window and disposed along an entire edge of the corresponding light-producing assembly; and a controller for activating a given light-producing assembly based on the corresponding proximity sensors detecting an onlooker outside the vehicle and proximate the corresponding side window.

8. The privacy window system of claim 7, wherein the light-producing assemblies each comprise a plurality of light sources and a photoluminescent structure configured to luminesce in response to excitation by light emitted from the plurality of light sources such that the resultant luminescent light is emitted through the corresponding window.

9. The privacy window system of claim 7, wherein the proximity sensors comprise capacitive sensors.

10. The privacy window system of claim 7, further comprising a camera system disposed onboard the vehicle and in communication with the controller, wherein the camera system is operable to capture and record images of the onlooker.

11. The privacy window system of claim 7, further configured to provide a live video stream accessible by a remote electronic device.

12. The privacy window system of claim 7, further configured to send an alert to a remote electronic device notifying a user of the remote electronic device that the onlooker is detected.

* * * * *